Patented Mar. 22, 1949

2,464,877

UNITED STATES PATENT OFFICE 2,464,877

ARYL ETHERS

Moushy Markarian, North Adams, and David B. Peck, Williamstown, Mass., assignors to Sprague Electric Company, North Adams, Mass., a corporation of Massachusetts No Drawing. Application May 18, 1946, Serial No. 670,855

6 Claims. (Cl. 260—613)

This invention relates to new diaryl ethers and more particularly refers to diaryl ethers containing at least one trifluoromethyl group substituted on an aryl group.

Diphenyl ether and a number of simple derivatives thereof, have been known and widely used for a number of years. In certain applications they have been unsatisfactory because of their electrical, chemical or physical properties.

It is an object of the present invention to produce new diaryl ethers. A further object is to produce new diaryl ethers with at least one trifluoromethyl group substituted on an aryl group. A still further object is to produce new diphenyl ether compounds useful for a wide range of purposes. Additional objects will become apparent from a consideration of the following description and claims.

These objects are attained in accordance with the present invention wherein there are produced compounds conforming to the following general formula:

$$R-O-R(CF_3)_n$$

wherein R represents an aryl group, which may be further substituted, and $n$ represents the integer 1, 2, 3, 4, or 5.

In a more restricted sense this invention is concerned with compounds conforming to the following general formula:

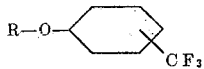

wherein R represents an aryl group which may be further substituted.

In a still more restricted sense this invention is concerned with compounds conforming to the following specific formula:

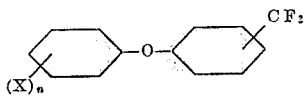

wherein X represents a substituent selected from the class containing halogens (particularly chlorine and fluorine) and alkyl groups and $n$ represents the integer 1, 2 or 3. The invention is also concerned with methods of making the above compounds and is specifically concerned with a process comprising reacting metabromo benzotrifluoride with alkaline salts of hydroxy aryl compounds such as phenol and ring-substituted phenols.

We have discovered that diaryl ethers having useful electrical, chemical and physical properties may be prepared by simple means. Among the preferred compounds of the invention are the following:

3-trifluoromethyl diphenyl ether
2-trifluoromethyl diphenyl ether
4-trifluoromethyl diphenyl ether
3-trifluoromethyl-4'-chloro diphenyl ether
3-trifluoromethyl-2'-chloro diphenyl ether
3-trifluoromethyl-3'-chloro diphenyl ether
2-trifluoromethyl-2'-chloro diphenyl ether
2-trifluoromethyl-3'-chloro diphenyl ether
2-trifluoromethyl-4'-chloro diphenyl ether
4-trifluoromethyl-2'-chloro diphenyl ether
4-trifluoromethyl-3'-chloro diphenyl ether
4-trifluoromethyl-4'-chloro diphenyl ether
3-trifluoromethyl-2',4'-dichloro diphenyl ether
3-trifluoromethyl-2',5'-dichloro diphenyl ether
3-trifluoromethylphenyl-1-naphthyl ether
3-trifluoromethyl-3'-ethyl diphenyl ether
3-trifluoromethyl-2',4'-dimethyl diphenyl ether In addition to the above compounds a wide variety of related materials may be obtained, in accordance with our invention. It is contemplated that diaryl ethers having a tri-fluoro methyl group on each aryl ring may be prepared. It is further contemplated that polyaryl cyclo polyethers may be obtained by reacting alkaline salts of meta halogen-substituted phenols, which may be further substituted, in the presence of copper or copper salts. The products thus obtained would have a structure with four aryl rings and four oxygen coupling elements. If alkaline salts of para halogen substituted phenols are reacted in the presence of copper or its salts, useful compounds are obtained which probably are polyaryl ethers of linear nature. We have found that aryl substitution by one or more trifluoromethyl groups will enhance appreciably the desirable properties of the resulting product, without decreasing its chemical stability. The reactions mentioned above may be combined to produce useful high molecular weight polyaryl ethers.

The following examples, wherein the quantities are stated in parts by weight, will serve to illustrate the means of obtaining the novel compounds of the invention.

EXAMPLE 1

Preparation of 3-trifluoromethyl diphenyl ether

| | Parts |
|---|---|
| (1 mole) m-bromo benzotrifluoride (B. P., 151°–152° C.) | 225 |
| Phenol (1.25 moles) loose crystals M. P. 41° C. | 118 |
| KOH (1 mole) pellets | 56 |
| Copper powder | 1 |

The phenol and KOH were placed in a 3 necked flask equipped with an oil sealed stirrer, reflux condenser with take off adapter, and a thermometer, and heated with stirring until all KOH had dissolved. The copper powder was then added, and then the m-bromo benzotrifluoride. The mixture was heated with stirring until H₂O and the m-bromo mixture began to reflux. The water was continuously separated and the m-bromo compound returned to the reaction. The rate of reflux gradually decreased as the reaction took place with separation of KBr until finally a temperature of 180°–190° C. was reached (approximately 3 hours). The mixture was kept at 180°–190° C. for another 2 hours, then cooled and poured into 1000 parts of water containing 30 parts NaOH. This was then steam distilled. The steam distillate consisting of the diphenyl ether and unchanged m-bromo compound was then separated from the water, washed with dilute NaOH, dried with MgSO₄, and fractionated. Recovered 25 parts m-bromobenzotrifluoride. Yield of ether—184 parts, boiling point 73°–75° C./1 mm.

R. I. 20° C.=1.5118
d20/4=1.240

EXAMPLE 2

*Preparation of 3-trifluoromethylphenyl-1-naphthyl ether*

| | Parts |
|---|---|
| m-Bromo benzotrifluoride | 232 |
| Alpha-naphthol (B. P. 135–137° C./7 mm.) | 240 |
| KOH | 65 |
| Cu powder | 1 |

The procedure of Example 1 was followed except instead of steam distillation, the reaction mixture was poured into dilute NaOH; the aqueous layer then separated from the heavy organic layer which was then washed with water, dried with MgSO₄ and fractionated. Recovered 109 parts, m-bromobenzotrifluoride. Yield of ether—52.5 parts, boiling point 152–154° C./2 mm.

R. I. 20° C.=1.5784
d20/4=1.2629

EXAMPLE 3

*Preparation of 3-trifluoromethyl-4'-chlorodiphenyl ether*

| | Parts |
|---|---|
| m-Bromo benzotrifluoride | 168.75 |
| p-Chlorophenol (M. P. 39–40° C.) | 120.75 |
| KOH | 42 |
| Cu powder | ¾ |

The procedure of Example 1 was followed, giving a recovery of the bromo compound of 39 parts. Yield of ether—75 parts, boiling point 93–95° C./1 mm.

R. I. 20° C.=1.5278
d20/4=1.3336

EXAMPLE 4

*Preparation of 3-trifluoromethyl-3'-ethyl diphenyl ether*

| | Parts |
|---|---|
| m-Bromobenzotrifluoride | 118 |
| m-Ethyl phenol | 64 |
| KOH pellets | 29.4 |
| Cu powder | .5 |

The procedure of Example 1 was followed, with a recovery of 10 parts of the m-bromo compound. Yield of ether—106 parts, boiling point 89° C./1 mm.

R. I. 20° C.=1.5100
d20/4=1.180

EXAMPLE 5

*Preparation of 2,4-dimethyl-3'-trifluoromethyl diphenyl ether*

| | Parts |
|---|---|
| m-Bromo benzotrifluoride | 129 |
| 2,4 Dimethyl phenol | 70 |
| KOH | 32 |
| Cu powder | 0.6 |

The procedure of Example 1 was followed, with a recovery of 20 parts of the unreacted m-bromo compound. Yield of ether—80 parts, boiling point 91–92° C./1 mm.

R. I. 20° C.=1.5113
d20/4=1.182

In the same manner, other aryl ethers with trifluoromethyl groups on one or more of the aryl groups may be prepared. Triaryl diethers may also be prepared by a suitable adaptation of the above method. Dihydroxy benzene compounds such as hydroquinone may be reacted with two moles of a bromo benzene, preferably also substituted with a trifluoro methyl group. Alternately, dibromobenzene may be reacted with the alkaline salt of phenol. By either method three phenyl groups would be interconnected by two oxygen atoms.

The electrical properties of the compounds of this invention are such that they may be employed in electrical condensers and for other dielectric purposes. For example, 3-trifluoromethyl-3'-ethyl diphenyl ether has a dielectric constant of 7.4 and a 1,000 cycle power factor of .013% at 26° C.; and 3-trifluoromethyl-2',4'-dimethyl diphenyl ether possesses a dielectric constant of 7.7 and a 1,000 cycle power factor of .012% at 26° C. Thus the ethers disclosed herein are useful as polar dielectric impregnants. They may be used alone, in admixture with one another and/or in admixture with prior art dielectric impregnants.

As many widely different embodiments of this invention may be made without departing from the spirit and scope hereof, it is to be understood that the invention is not limited to the specific embodiments hereof except as defined in the appended claims.

What we claim is:

1. A compound conforming to the following general formula:

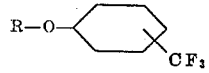

wherein R represents an aryl group.

2. A compound conforming to the following general formula:

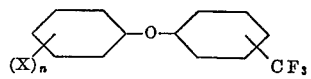

wherein X represents a substituent selected from the class consisting of halogen and alkyl groups, and n represents an integer.

3. A compound conforming to the following general formula:

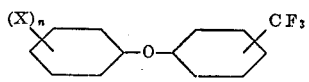

wherein X represents an alkyl group and n represents an integer.

4. 3-trifluoromethyl diphenyl ether.
5. 3-trifluoromethyl phenyl-1-naphthyl ether.
6. 3-trifluoromethyl-3'-ethyl diphenyl ether.

MOUSHY MARKARIAN.
DAVID B. PECK.

REFERENCES CITED

The following references are of record in the file of this patent:

UNITED STATES PATENTS

| Number | Name | Date |
|---|---|---|
| 2,022,634 | Britton et al. | Nov. 26, 1935 |
| 2,072,797 | Clark et al. | Mar. 2, 1937 |
| 2,170,782 | Clark | Aug. 22, 1939 |
| 2,198,473 | Clark | Apr. 23, 1940 |

OTHER REFERENCES

Ser. No. 304,859, Petitcolos (A. P. C.), pub. June 15, 1943.